L. S. LACHMAN.
PROCESS OF ELECTRIC WELDING.
APPLICATION FILED MAY 8, 1907. RENEWED APR. 27, 1908.
904,882.
Patented Nov. 24, 1908.
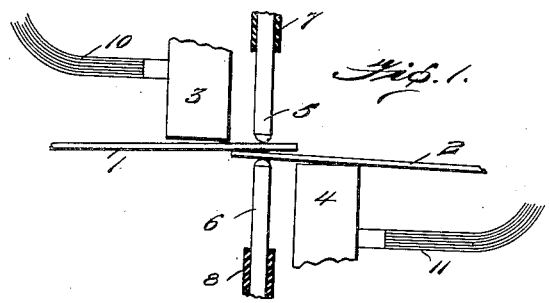
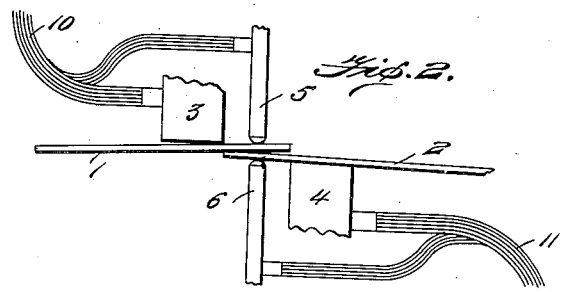
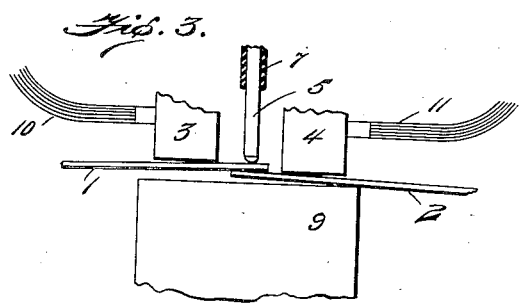
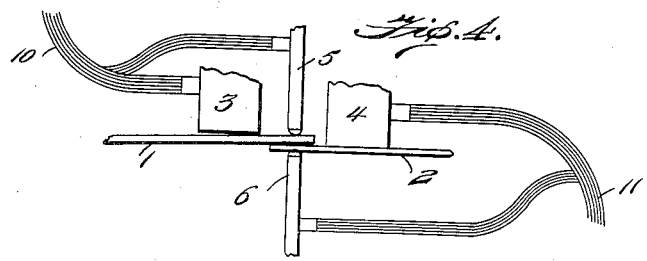
Witnesses
B. M. Offutt
A. M. Houghton
Inventor
Laurence S. Lachman,
By
Dickerson, Brown, Raegener & Binney
Attorneys

UNITED STATES PATENT OFFICE.

LAURENCE S. LACHMAN, OF NEW YORK, N. Y.

PROCESS OF ELECTRIC WELDING.

No. 904,882.　　　　Specification of Letters Patent.　　　Patented Nov. 24, 1908.

Application filed May 8, 1907, Serial No. 372,505. Renewed April 27, 1908. Serial No. 429,477.

*To all whom it may concern:*

Be it known that I, LAURENCE S. LACHMAN, a citizen of the United States, residing in the borough of Manhattan, city, county, and State of New York, have invented a certain new and useful Process of Electric Welding; and I do hereby declare the following to be a full, clear, and exact description of the same, such as will enable others skilled in the art to which it appertains to make and use the same.

This invention relates to processes of electric welding and consists in a method of producing autogenous spot welds between sheets of metal of comparatively large area by forcing such sheets together by a localized pressure applied where such spot welds are desired.

In the prior art it has generally been the custom to attempt to weld the entire abutting faces of pieces of metal to be united and this has practically restricted electric welding to one form or another of butt-welding; the union of the comparatively small end faces of rods, wires and the like. Union of sheets of metal face to face in this manner is impracticable, both for the reason that an inordinate amount of current is required to heat to a welding condition conductors of large cross-section and because this heat is detrimental and dangerous to sheet metal where the entire sheet must be raised to this temperature. I have, however, discovered that a few thoroughly united autogenous spot welds distributed between abutting faces of layers of sheet metal or other large-area abutting surfaces, are quite sufficient to furnish all the strength of union necessary for ordinary purposes, and such spot welds may be formed without consumption of inordinate amounts of current and without danger to the metals to be united. The use of such a plurality of spot welds has all the advantages of riveting with far superior strength and without the risk of working loose.

In the present invention I have devised a cheap, simple and ready method of making such autogenous spot welds. In this method, which is particularly adapted for lap welding of sheet metal, the sheets to be united are placed with their ends overlapping a suitable distance, giving a comparatively large area of superficial contact and an electric current is passed from the one plate to the other through this overlap. During the passage of the current the two plates are pressed together at the point where a spot weld is desired by means of a punch having a face of comparatively limited area, or two coöperating punches. Under this localized pressure the sheet metal develops a localized heating effect, the great bulk of the current going through the better contact afforded under the point of the punch. Welding currents are used at a very low voltage and are very sensitive to differences in contact resistances. Under the influence of this heightened flow of current and the pressure of the punches the localized area of plastic metal of the two plates coalesces under the punch to form an autogenous and permanent spot weld. The process may of course be repeated to form as many spot welds as are desirable in uniting two pieces of sheet metal.

Auxiliary current may be sent through the punch or punches into the metal if it be so desired. One punch or a pair of oppositely placed punches may be used. The poles carrying current to the sheet metal should be on opposite lateral sides of the punch or punches.

In the accompanying illustration I have shown, more or less diagrammatically, certain types of apparatus of the many adapted to perform my process.

In this showing; Figure 1 discloses two plates of metal, 1 and 2, laid with overlapping ends and respectively bearing on poles 3 and 4 connected through conductors 10 and 11 with a source of current (not shown). Above and below the lap are two punches, 5 and 6, placed in line with each other and preferably provided with insulating material 7 and 8. Suitable means (not shown) may be employed to force these punches towards each other, or they may be so forced by hand. Fig. 2 shows the same arrangement save that the punches are placed in circuit and current allowed to pass through them as well as through the poles proper; an expedient useful in welding heavy plates. In Fig. 3 the two pole pieces instead of being above and below are both on the same side of the plates to be joined while support 9 carries the plates. In this structure but a single punch is shown. As shown, it carries no current and is provided with insulation (7). In Fig. 4, the poles are on the same side of the sheets but two punches are employed; one above and one below. As shown they are connected to carry current.

In the operation of the device of Fig. 1, the two plates tend to spring away from the poles till the approximation of the punches and their pressure on the lap brings the plates into good contact with the poles and causes the welding current to flow and to become localized at a spot between the ends of the punches with consequent production of a spot weld.

In the operation of Fig. 2, the development of the spot weld is facilitated by causing current to flow through the punches to the metal. Each punch is connected with the source of current feeding the pole contacting with the same plate.

In Fig. 3, the two poles and the punch are all located on the upper side of the two plates, one pole contacting with each and the punch bearing on the lap.

In Fig. 4, the two poles are also on the upper side of the two plates, but two punches engage the lap, one above and one below, each punch being in circuit with the pole contacting with the same plate.

With all these devices, a spot weld of very small area as compared with that of the contacting surfaces of the two plates forms at the point where the pressure of the punch or punches causes current to flow between the two lapped plates and brings the metal at this point into a welding, that is to say, a plastic condition. Coalescense of the metals readily takes place at this spot, forming an integral autogenous weld. On shifting the plates to one side and once more pressing the punch or punches another spot weld is formed isolated from the first. Preferably a number of these individual isolated spot welds are formed between each pair of plates. Three such welds outlining a triangle form a very stiff desirable union, but for most purposes in making lap welds of sheets of metal a transverse series of isolated spot welds does very well. The sheets so joined behave like rivet-united sheets save that the union is stronger and more permanent.

The sheets of metal offer the current flowing from the large pole pieces shown a conductor of comparatively large cross section and one which therefore will not heat up to any material extent save in the annular zone where the current converges to pass from the one plate to the other through the spot of relatively good contact afforded under the pressure of the punch or punches. In this annular zone however the metal heats sufficiently to become plastic and afford a weld. By thus sending the current through the larger conductor afforded by the plates it is unnecessary to send more than a small auxiliary current, if that, through the punches, thereby permitting the use of stiff metal punches, such as steel, and avoiding the necessity of copper weld-poles.

The full amount of current could not be sent through a steel punch intended to make spot welds under the present invention for the reason that the current intended to make a spot weld of, say, half an inch square in area in a steel plate must obviously be enough to make half a square inch of steel plastic and a steel punch with a face or body of this cross-sectional area would of course not stand such a current without itself softening or melting down. But by sending the current, or the bulk of it, through the conductor of large cross-section afforded by the plates steel punches or stiff-copper punches may be employed without fear of their heating detrimentally.

What I claim is:—

1. The process of uniting metal sheets by autogenous spot welds which consists in overlapping the ends of such sheets, connecting each sheet to a source of welding current and pressing a punch having a working face of much smaller area than the area of the lapped portions of the sheets against such lapped portions till an autogenous spot weld forms under the localized development of heat.

2. The process of uniting metal sheets by autogenous spot welds which consists in overlapping the ends of such sheets connecting each sheet to a source of welding current and pressing a pair of alined punches having working faces of much smaller area than the area of the lapped portions of the sheets against such lapped portions till an autogenous spot weld forms under the localized development of heat.

3. The process of uniting metal sheets by autogenous spot welds which consists in overlapping the ends of such sheets, connecting each sheet to a source of welding current, and pressing a punch, also connected to the source of welding current, having a working face of much smaller area than the area of the lapped portions of the sheets against such lapped portions till an autogenous spot weld forms under the localized development of heat.

4. The process of uniting metal sheets by autogenous spot welds which consists in connecting said sheets to opposite terminals of an energized circuit, overlapping said sheets and applying localized pressure to a spotlike area of the overlapped sheets at the point of intended weld, and thereby locally improving the electric contact between the sheets in said spotlike area and producing a localized concentration of the flow of current, until an autogenous spot weld forms.

5. The process of uniting metal sheets by autogenous spot welds which consists in connecting said sheets to opposite terminals of an energized circuit, overlapping said sheets, applying localized pressure against a spotlike area of the overlapped sheets by means of a pressure member having a working face of comparatively small area, said pressure member also being connected to one of said terminals, and continuing the flow of current and application of pressure until a spot-like weld of restricted area forms between abutting faces of said sheets.

In testimony whereof I have signed this specification in the presence of two subscribing witnesses.

LAURENCE S. LACHMAN.

Witnesses:
LEO J. MATTY,
H. M. MARBLE.